United States Patent
De Wilde et al.

(10) Patent No.: US 9,539,754 B2
(45) Date of Patent: Jan. 10, 2017

(54) METHOD OF MANUFACTURING AN INJECTED AND BLOWN PRODUCT

(71) Applicant: The Procter & Gamble Company, Cincinnati, OH (US)

(72) Inventors: Vincent Hubert M. De Wilde, Kessel-Lo (BE); Guy Hubert Stephane Sylvain Culeron, Sint-Genesius Rode (BE); Francisco Miguel De Tavares Duarte Nogueira, Dendermonde (BE)

(73) Assignee: The Procter & Gamble Company, Cincinnati, OH (US)

( * ) Notice: Subject to any disclaimer, the term of this patent is extended or adjusted under 35 U.S.C. 154(b) by 77 days.

(21) Appl. No.: 14/089,918

(22) Filed: Nov. 26, 2013

(65) Prior Publication Data

US 2014/0144869 A1  May 29, 2014

(30) Foreign Application Priority Data

Nov. 27, 2012 (EP) .................................... 12194320

(51) Int. Cl.
*B29C 49/06* (2006.01)
*B29C 49/64* (2006.01)
(Continued)

(52) U.S. Cl.
CPC ............... *B29C 49/06* (2013.01); *B29C 49/18* (2013.01); *B29C 49/6418* (2013.01); *B65D 41/26* (2013.01); *B29L 2031/56* (2013.01)

(58) Field of Classification Search
None
See application file for complete search history.

(56) References Cited

U.S. PATENT DOCUMENTS

| 3,277,223 A | 10/1966 | Curto |
| 4,566,508 A | 1/1986 | Bowyer |

(Continued)

FOREIGN PATENT DOCUMENTS

| EP | 1529735 B1 | 8/2006 |
| JP | S61-61823 | 3/1986 |

(Continued)

OTHER PUBLICATIONS

European Search Report for 12194320.3-1706 dated Mar. 7, 2013.
(Continued)

*Primary Examiner* — Monica Huson
(74) *Attorney, Agent, or Firm* — Lauren Christine Gonzalez; Gary J. Foose

(57) ABSTRACT

The present relates to a method of manufacturing a product by the steps of
 i) injecting a sufficiently heated thermoplastic material into a $1^{st}$ cavity to form a preliminary product comprising a collar having a connecting feature located on the inner surface thereof, then
 ii) optionally cooling the preliminary product of step i), then
 iii) blow molding the preliminary product in a $2^{nd}$ cavity to form a void volume, wherein steps i) to iii) are performed in a single molding unit, then
 iv) removing the finished product produced in step iii) from the single molding unit.

18 Claims, 4 Drawing Sheets

(51) Int. Cl.
*B65D 41/26* (2006.01)
*B29C 49/18* (2006.01)
*B29L 31/56* (2006.01)

(56) References Cited

U.S. PATENT DOCUMENTS

| | | | |
|---|---|---|---|
| 4,941,815 A * | 7/1990 | Julian | 425/525 |
| 5,008,066 A | 4/1991 | Mueller | |
| 5,060,827 A * | 10/1991 | Segati | 222/109 |
| 5,067,891 A * | 11/1991 | Julian | B29C 49/76 264/512 |
| 6,811,846 B1 | 11/2004 | Ota et al. | |
| 7,594,595 B2 | 9/2009 | Gueret | |
| 2001/0030165 A1 | 10/2001 | Jacobs | |
| 2002/0096542 A1* | 7/2002 | Crofts et al. | 222/504 |
| 2005/0081880 A1 | 4/2005 | Gueret | |
| 2008/0035602 A1 | 2/2008 | Gooden et al. | |
| 2011/0204060 A1 | 8/2011 | Suzuki | |
| 2012/0298543 A1 | 11/2012 | Davis et al. | |
| 2015/0343693 A1 | 12/2015 | Nogueira | |

FOREIGN PATENT DOCUMENTS

| | | |
|---|---|---|
| JP | 2006-024329 | 1/2006 |
| JP | 2008-115900 A | 5/2008 |

OTHER PUBLICATIONS

PCT International Search Report and Written Opinion ffor PCT/US2013/071418, dated Jan. 21, 2014.

Non-Final Office Action for U.S. Appl. No. 14/722,313, mailed Apr. 22, 2016, 12 pages.

* cited by examiner

METHOD OF MANUFACTURING AN INJECTED AND BLOWN PRODUCT

TECHNICAL FIELD

The present invention relates to a method for manufacturing a product, for example a dosing cap, by the steps of injection forming a thermoplastic material in a $1^{st}$ cavity to form a preliminary product comprising a connecting feature on the inner surface thereof, and then blow moulding the thermoplastic material in a $2^{nd}$ cavity to make a void volume. The injection and blow molding steps are carried out in the same moulding unit, without removing the preliminary product from the moulding unit.

BACKGROUND TO THE INVENTION

Products, such as plastic bottles, containers and other products can be made using a number of techniques depending on the requirements of the product. Products, including bottles and containers may be made using multiple techniques if, for example, different materials must be used or different functions are required. For example bottles are generally made by either i) extrusion blow molding, wherein a parison is made by extruding molten material around a mold composed of 2 separate cavities, trapping a free end, forming a hollow area between the cavities and then blowing air through the parison, pushing it towards the cavities walls and making the bottle shape, or ii) first injection molding a preform, often resembling a test tube shape with a collar area, wherein the screw thread of the bottle is formed on the outside of the collar area, then the preform is moved to a different production unit and is blown to make the bottle. Most plastic bottles used as packaging containers have an outside-facing thread or other closure or finish etc on the neck portion, to which a cap may be fitted. This outside-facing thread can be formed by using a split mold, comprising at least two mold components, when either forming the parison or injecting a preform.

When developing caps for attachment to bottles with outside-facing thread, the screw thread thereof, must be on the inside of the cap in order to be able to connect with the screw thread on the outer surface of the neck of the bottle. In this context, the inside facing thread, is delivered by transfer moulding from an outer-facing thread pattern formed on the outer surface of a core mold component. Therefore, after production, the core would need to be disengaged from the finished product. Disengaging the core from the finished article may be done so by rotating the core, and moving it in the axial direction. Therefore, the rotation and the axial moving should be synchronized. However, the synchronizing action mechanically limits the speed of production and synchronization can be poor, resulting in damage to the formed thread. Moreover, since the thread is prepared using heated material, when pulling out the core, the thread can be damaged. An alternative to the above method, is where instead of rotation and axial movement of the product, it is simply pulled from the core using mechanical force. Whilst this system of disengagement of the product from the mould is simple and quick, it may result in damage to the thread, resulting in a poor connection points and potential leakage when joined with a bottle. Moreover the shaping of the thread itself must use minimal height thread and rounded corners in order to allow the mechanical 'bump-off' release. These latter features result in poor connection between bottle and cap, mispositioning of the cap during screwing, low maximum application torque, and potential leakage. A further known method of making inner thread products consists in molding the cap in a one step injection molding process, by using a collapsible core which molds all the inner surfaces. At the end of the injection molding cycle, the core retracts, so that its undercut portion can be ejected through the bottom part of the dosing cylinder which has a restricted diameter. The major disadvantages in molding a dosing cap with undercut using collapsible cores, are that the production speed is slow and the collapsible cores are fragile, they are worn out/broken easily, resulting in frequent halts to production, changing of tools, reduced tool capacity and cost escalation.

Dosing devices in the past have generally fitted onto the cap. They are generally not attached to the bottle or cap other than through friction of the dosing device on either cap or bottle. Manufacturing a separate cap and dosing device is clearly not economical, requiring further process and production equipment, space in plant and additional materials. Moreover the process is slowed due to the need to not only fit a cap to a bottle, but also a dosing device.

It has been the Applicants objective to combine the requirements of the cap and dosing device to one product, which can then be subsequently connected to a bottle and develop a method of making such a device which is efficient and economical and permits varied dosage sizes.

SUMMARY OF THE INVENTION

According to the present invention there is provided a method of manufacturing a product (1) by the steps of
i) injecting a sufficiently heated thermoplastic material into a $1^{st}$ cavity to form a preliminary product (2) comprising a collar (3) having a connecting feature (4) located on the inner surface (5) thereof, then
ii) optionally cooling the preliminary product (2) of step i), then
iii) blow moulding the preliminary product in a $2^{nd}$ cavity to form a void volume (6), wherein steps i) to iii) are performed in a single moulding unit, then
iv) removing the finished product produced in step iii) from the single moulding unit

DETAILED DESCRIPTION OF THE INVENTION

Figure 1:
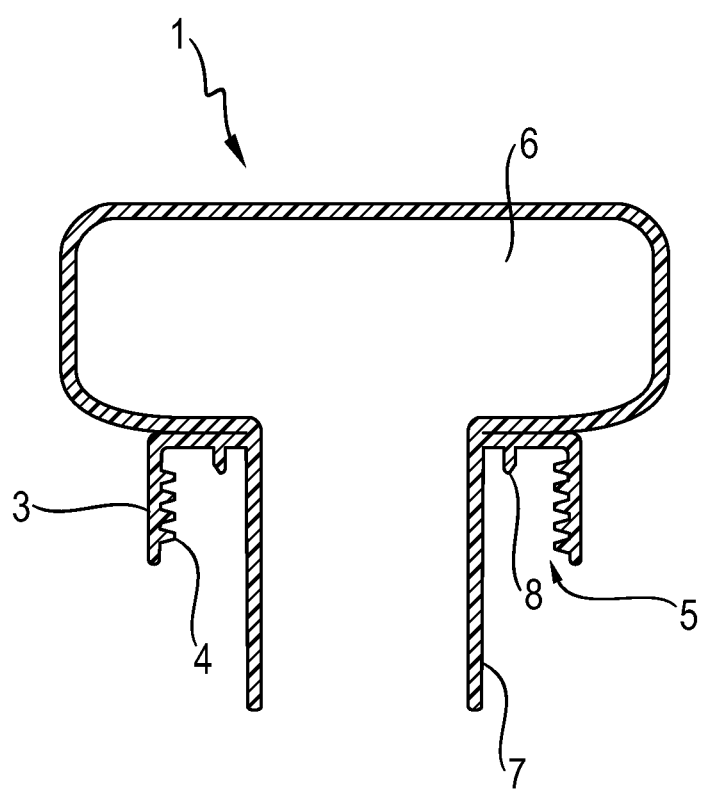
FIG. 1 shows a side view of the product
Figure 2:
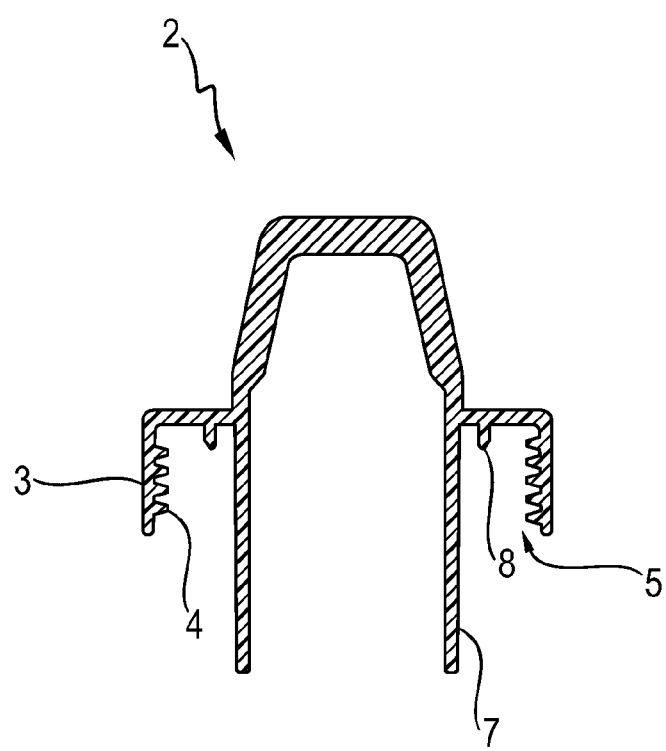
FIG. 2 shows a side view of the preliminary product
Figure 3:
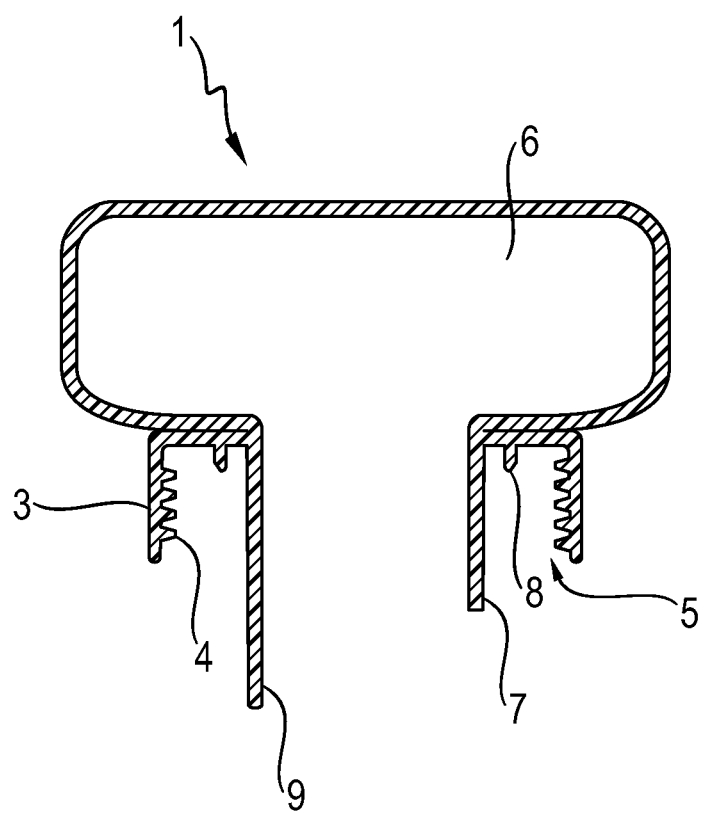
FIG. 3 shows a side view of the product with a double wall and pouring spout
Figure 4:
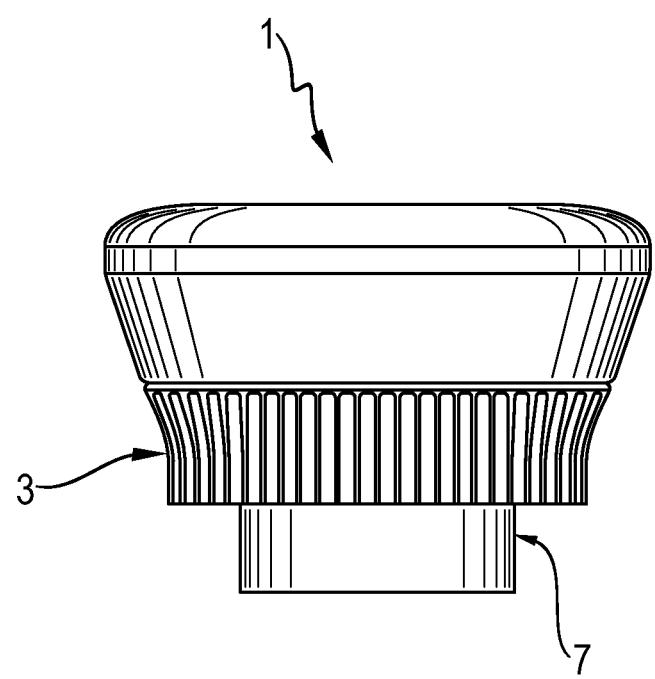
FIG. 4 shows a side view of the product

The method of the present invention is used to manufacture a product (1), preferably a dosing cap, handle, or both. The method involves a first injection step, a period of cooling and then a blow-moulding step.

Thermoplastic Material

The product (1) of the present invention is made using thermoplastic material. Any suitable thermoplastic material may be useful herein. Such thermoplastic materials may include normally solid polymers and resins. In general, any solid polymer of an aliphatic mono-1-olefin can be used within the scope of this invention. Examples of such materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide products having particularly desirable properties. Other thermoplastic materials that can be used in the practice of the invention include the acrylonitrile-butadiene-styrene resins, cellulosics, copolymers of ethylene and a vinyl monomer with an acid group such as methacrylic acid, phenoxy polymers, polyamides, including polyamide-imide (PAI), polycarbonates, vinyl copolymers and homopolymer, polymethylmethacrylate, polycarbonate, diethyleneglycol bisarylcarbonate, polyethylene naphthalate, polyvinyl chloride, polyurethane, epoxy resin, polyamide-based resins, low-density polyethylene, high-density polyethylene, low-density polypropylene, high-density polypropylene, polyethylene terephthalate, styrene butadiene copolymers, acrylonitrile, acrylonitrile-butadiene copolymer, cellulose acetate butyrate and mixtures thereof, polyaryletherketone (PAEK or Ketone), polybutadiene (PBD), polybutylene (PB, Polybutylene terephthalate (PBT), Polyetheretherketone (PEEK), Polyetherimide (PEI), Polyethersulfone (PES)—see Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polyvinyl chloride (PVC), Polyvinylidene chloride (PVDC), Spectralon. Further preferred materials include Ionomers, Kydex, a trademarked acrylic/PVC alloy, Liquid Crystal Polymer (LCP), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), polyethylene furanoate (PEF), and mixtures thereof.

Other thermoplastic materials that can be used in the practice of the invention include the group of thermoplastic elastomers, known as TPE, which include styrenic block copolymers, polyolefin blends, elastomeric alloys (TPE-v and TPV), thermoplastic polyurethanes (TPU), thermoplastic copolyester and thermoplastic polyamides.

Particularly preferred thermoplastic materials are those selected from the group consisting of polyolefins and derivatives thereof. More preferably the thermoplastic material is selected from the group consisting of polyethylene, polypropylene, including low-density, but particularly high-density polyethylene and polypropylene, polyethylene terephthalate, polyethylene furanoate (PEF), thermoplastic elastomers from polyolefin blends and mixtures thereof.

The product may be formed from a virgin resin, a reground or recycled resin, petroleum derived resins, bio-derived resins from plant materials, and combinations of such resins. The containers may comprise fillers and additives in addition to the base resin material. Exemplary fillers and additives include colorants, cross-linking polymers, inorganic and organic fillers such as calcium carbonate, opacifiers, and processing aids as these elements are known in the art.

Injection

In a first step of the method of the present invention, thermoplastic material is heated to a sufficient temperature and then injected into a 1st cavity to make a preliminary product (2). The preliminary product (2) comprises a collar (3). The collar (3) comprises an inner and an outer surface. The collar comprises a connecting feature (4) on the inner surface (5) thereof. The collar of the preliminary product, and subsequent finished product, is designed to connect with another element. For example, where the product produced according to the invention is a dosing cap, the collar is the connection point between the dosing cap and the bottle. Where the product according to the invention is a handle, the collar is the connecting point between the handle and the item to which the handle is to be attached. The collar of the preliminary product is accurately made and sufficiently rigid to serve the intended purpose. Preferably the connecting feature (4) is selected from the group consisting of a feature capable of interlocking engagement between two surfaces, such as threads which requires full or partial rotation to engage and disengage, bump-off frictional connection feature which requires opposite direction forces to engage and disengage, squeezing feature which require a combination of perpendicular and opposite direction forces to allow partial deformation of one or multiple parts creating space to engage and disengage, and a sealing feature (8).

More preferably the connecting feature is a thread, bump off or sealing feature. More preferably the connecting feature is a thread.

A sealing feature (8), where present, is designed to fit against the edge or side of the item, for example a container, to which the collar (3) is attached. The sealing feature should closely abut the bottle and is designed to prevent or reduce leakage of the contents of the container. For example, wherein the product is a dosing cap, which is connected to a container, the sealing feature is preferably located on an inner surface of the collar, such that it will tightly seal against the container. In one preferred embodiment, the product comprises a double wall (3 and 7), described hereinafter, and the sealing feature (8) is located between the inner (7) and outer wall, which is the collar (3).

Preferably the collar (3) comprises a screw thread (4) and, even more preferably additionally a sealing feature (8).

The connecting feature (4) on the inner surface (5) of the collar (3) permits the collar to be connected to another item. For example it is envisaged that the product of the present invention may be connected to a bottle, container or other. The item to which the collar is attached will have a coordinating connecting feature which cooperates with the connecting feature of the collar. Preferably, the thermoplastic material is heated sufficiently to render the material fluid or malleable enough so as to be injected. The specific temperature needed to achieve this step is, of course, dependant on the material used. The material will preferably be heated to a temperature suitable to melt the material such that it may flow under pressure, however optionally or preferably should not be heated as far as the degradation temperature, where the material is liable to oxidation during molding operations and to chain degradation. In both cases molecular bonds on the material become weaker and the material becomes prone to faster degradation when exposed to environmental circumstances. Preferably polypropylene is heated to a temperature between 210-290° C. Preferably polyethylene terephthalate is heated to a temperature above 280° C. Preferably polyethylene is heated to a temperature between 130-170° C.

Heating of the material is achieved at any suitable and appropriate point in the process prior to injection, and using any suitable equipment for the purpose. However it is preferable that heating is achieved in commercially available injection molding equipment, such as an injection press, and is sufficient to force the molten material in a controlled way inside the mold. The press is preferably equipped with a ram or screw-type injection screw which heats up, melting the material and mixing it homogeneously and in a controlled manner. Alternatively, the material may be heated using standard injection molding equipment known as a runner, which makes the interface between the injection screw and the mold, manages the flow into the mold and in some cases keeping the material temperature and pressure. The length of time necessary to heat the material is dependent on the material itself, the amount of material used, the design of the injection equipment and design of the product being made.

The fluid material is then injected into the 1st cavity. The material is preferably injected into the $1^{st}$ cavity, through one or more injection gates, as quickly as possible, so as to reduce cycle time to its minimum possible, but slow enough so as to ensure the adequate filling of the cavity. The speed of injection is dependant on the material chosen and on the design of the product to be made. Preferably the cavity is heated prior to and/or during injection from ambient temperature up to around 65° C.

Once the material is injected, the preliminary product (2) and, optionally the cavity, may be cooled. The product and the cavity may be allowed to cool passively or actively. Passive cooling could involve simply leaving the product to cool naturally within the mold. Active cooling may involve using a further device to assist and accelerate cooling. Active cooling may be achieved by passing a coolant, typically water, close to the mould, or blowing cool air, as another coolant example, at the cavity and/or product. The coolant absorbs the heat from the mold and keeps the mold at a suitable temperature to solidify the material at the most efficient rate. The moulding unit can be opened when the part has solidified sufficiently to retain its shape, enabling the material to be demolded from the $1^{st}$ cavity without damage. However the preliminary product is not ejected from the moulding unit. Preferably at least the collar (3) of the preliminary product is actively cooled to reduce deformation. More preferably the product is cooled using coolant which passed close to, but separate from the moulding unit. Cooling can take from 1-15 seconds, preferably 2-10 s, most preferably 3-8 seconds. Actively cooling is beneficial to decreasing cycle times of the manufacturing process.

The preliminary product is preferably allowed to cool to a point below the glass transition temperature of the material. At temperatures below the glass transition temperature, the preliminary product rapidly solidifies, retaining its shape. For example, polypropylene is cooled to a temperature of approximately 50° C. to 100° C., more preferably 50-60° C. In a particularly preferred embodiment, the collar of the preliminary product is permitted to cool, preferably below 50-60° C. so that it retains its molded shape. The remaining area, which will be blown during step 3, may be kept at a higher temperature. Fast cooling the cavity and/or preliminary product can add gloss or shine to portions of the outer surface thereof.

Further steps may be incorporated into the injection method of the present invention. In one embodiment, it may be preferred to include multiple injection steps. In this embodiment, a first material may be injected into the $1^{st}$ cavity to produce $1^{st}$ part of the preliminary product. The $1^{st}$ part of the preliminary product is then cooled to a temperature low enough to allow further mould operations without damaging the preliminary product. Preferably the $1^{st}$ preliminary product is cooled to a temperature between 88° C. and 95° C. After the $1^{st}$ material is cooled and sufficiently solid, the $1^{st}$ cavity shape is changed. A $2^{nd}$ material can then be injected into the new cavity shape to make a $2^{nd}$ part of the preliminary product. The preliminary product is made in such a way that the materials from the $1^{st}$ and $2^{nd}$ injection are in direct contact with one another, allowing the materials to bond. Hence the temperature of both parts of the preliminary product are preferably sufficient to achieve bonding, more preferably the temperature is higher than 88° C. The $2^{nd}$ material to be injected can be the same material as the $1^{st}$ material, or different. Alternatively two materials may be injected simultaneously into the $1^{st}$ cavity during a co-injection technique.

Preferred equipment to achieve multiple injection steps is known as a core-back technology. Once the $1^{st}$ material has been injected into the cavity and it is sufficiently cooled, a core unit, or core-back, is removed creating an open space in the cavity which was previously not accessible to the $1^{st}$ material at the time of the injection. Since the $1^{st}$ material has now been formed and cooled, it cannot flow to occupy the newly made space. A $2^{nd}$ injection can then take place, preferably at a different injection location within the newly open cavity space, to inject a $2^{nd}$ material, adding an additional feature to the preliminary product.

If both materials are the same or chemically similar, thermal bonding between them is improved. It is also possible to inject different thermoplastic material, and whilst bonding between them is more difficult, it allows the product to have multiple characteristics, such as different transparency, opacity or flexibility.

Creating the preliminary product from 2 materials permits the manufacturer to treat the materials and the injected products thereof, differently. For example where the $1^{st}$ material is used to make the collar of the preliminary product, it may be cooled more quickly that the $2^{nd}$ material. The temperature of the $2^{nd}$ part of the preliminary product can then be maintained at a higher temperature to improve efficiency during the blowing step, potentially avoiding or reducing the need to reheat or prolong cooling. In this way, a preliminary product may be built comprising further features, or use different coloured materials, materials with different translucency, or use different materials to perform a different function or provide an aesthetic difference benefit. Alternatively, the $2^{nd}$ material may be the same as the $1^{st}$ material. Further injection steps may also be envisaged.

Optional Heating

Following the injecting step, the preliminary product is optionally heated. Preferably the product is reheated to a temperature suitable for blow-moulding. When reheating it is further preferred that the area of the preliminary product to be blown is reheated uniformly. Preferably, the material of the preliminary product to be blown is heated, whereas the collar is not heated. Most preferably however, the area of the preliminary product to be blown is maintained at a temperature suitable for blowing, whilst the collar is cooled to a point where it is hardened and no longer deformable. The benefit herein is that the collar is not damaged during blow molding of the remaining material.

Blow Molding

In the third step of the present method, the preliminary product is blow molded in a $2^{nd}$ cavity to create a void volume (6). The preliminarily product is blown by submitting the internal space thereof to pressure. When using polypropylene, the blow molding area is preferably at a temperature of 110° C. to 140° C. The pressure, being omnidirectionally exerted, causes the thermoplastic material to be forced outwardly. The $2^{nd}$ cavity space is that created by the mould, but also parts of the preliminary product. Once the material is applied to the relatively cold walls of the cavity and preliminary product, on contact therewith, the material cools rapidly and solidifies. The pressure applied has an influence on the uniformity and thickness of the material after the blowing step. High pressure, will improve uniformity and encourage thin walls, but may also result in areas of no material and holes. A low pressure may result in a lack of uniformity, and not successfully covering the whole blowing mould with material. The pressure to be selected is dependent on the material used and the shape of the mould.

Manufacturing Equipment

The method of the present invention may be achieved using any suitable equipment. In a preferred embodiment however, the method is achieved using equipment comprising at least one section thereof capable of rotating about an axis. Preferably the rotating section is capable of rotating at least 90° or alternatively 180°. A section of this kind described is also known as a turning-table. The purpose of this turning movement is to achieve multiple steps during a single moulding cycle. In the present method, the mould is first aligned with the injection capability. Then once the injecting step is complete and the preliminary product made, the mould or part thereof, comprising the preliminary product, may be turned to coordinate with a blowing capability and the preliminary product of the $1^{st}$ step is blown. Alternatively, the turning movement of the moulding unit can be performed outside the functional space where it connects with injection and blow molding capability. This can be realized through some kind of cassette system. Alternatively, the equipment may not comprise a turning-table, and instead the preliminary product and moulding unit remain stationary and the injection capability is exchanged for blow-molding capability. Alternatively, in the present method, the mould is first aligned with the injection capability. Then once the injecting step is complete and the preliminary product made, the mould or part thereof, comprising the preliminary product, may be transferred along a path, which may be linear, non-linear, with multiple direction changes, to coordinate with a blowing capability and the preliminary product of the $1^{st}$ step is blown.

It is possible, and in some instances preferred, that the injection mould or particularly a part thereof, is also a part of the blow mold cavity during the blowing step. This means that the preliminary product will be blown against part of the injection mold, and/or against some of the preliminary product, and against the blow mold cavity. In this way, one can substantially reduce the complexity of the blow mould, and reduce or eliminate the need for this blow mold to open in two halves in order to eject the product. This is because the split line between the injection half mold and blow mold can be done in such a way to eliminate or reduce any 'undercut' for the product against the blow mold cavity during the demolding operation, in case the blown cavity has a larger diameter than the neck itself.

Once the product is made, and after a suitable cooling, preferably to 50-60° C., the mould is opened so that the product is ejected. The moulding cycle can then be repeated. In a preferred embodiment, it is possible to use steps 1 and 3 at the same time, such that while a preliminary product is being blown in step 3, another preliminary product is being made in step 1.

Product

The product manufactured according to the process of the present invention, is preferably a cap, dosing cap, handle or other attachment product, but the product is designed to cooperate with another element. The other element may be a bottle or the cap of a bottle or other. The product is preferably a dosing cap. The dosing cap produced according to the present method comprises a connecting feature on the inner surface there. The connecting feature may be a protruding frictional or interference feature such as a bump, bulge or rib, but is preferably a screw thread. The dosing cap, in this preferred embodiment, can be used to cap a bottle or container, and can also serve to container a required dose of the contents of the bottle. The dosing cap may be any suitable size. However the void volume created during the blow moulding step, preferably has a volume from 10 ml to 250 ml, more preferably at least 25 ml to 150 ml and most preferably at least 35 ml to 100 ml. The void volume describes the inner volume of the dosing cap and provides the area to be filed with composition to be dosed. A particularly important advantage of this method of producing the product is that the void volume can be altered without requiring entirely new equipment. To make dosing caps of different void volume, it is only required to change the $2^{nd}$ cavity size where the preliminary product is blown. This benefit permits greater flexibility to the manufacturer and thus economic advantage.

The blown part of the dosing cap may be of any shape, however the collar is shaped to cooperate with the other element, such as the opening of a bottle to which the cap is to be applied. The blown void volume of the dosing cap is preferably generally curved and ball-like. A curved, ball shape, is useful to the consumer as it sits in the hand steadily to allow maximum control whilst dosing into the void volume.

The dosing cap preferably has a double wall structure (3 and 7). A double wall structure is designed to collect dripped fluid and return it to the bottle, once the dosing cap is replaced on the bottle. The collar (3) with connecting feature (4) forms the outer wall of a double wall structure. The inner wall (7) is interior to said collar. The inner (7) and outer walls (collar, 3) are preferably concentric and may also be preferably parallel. The inner wall preferably extends to a height which is higher than the outer wall collar. The distal end of the inner wall (7) may be of one consistent length, or alternatively may be at varying length, so as to produce a waved pattern or alternatively, to produce a pouring spout (9). The pouring spout is achieved by making a second and inner wall with a singular highest point, the height then decreases on both sides to a singular lowest height, thus producing an oblique shaped wall, when viewed from the side.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A method of manufacturing a product (1) by the steps of
   i) injecting a sufficiently heated thermoplastic material into a $1^{st}$ cavity to form a preliminary product (2) comprising a collar (3) having an inner surface (5), wherein a connecting feature (4) is located on the inner surface (5), then
   ii) cooling the collar (3) of the preliminary product (2) of step i), then an area of the preliminary product (2) to be blown is reheated to a temperature suitable for blow-moulding wherein the collar (3) is not heated, then
   iii) blow moulding the preliminary product in a $2^{nd}$ cavity to form a void volume (6), wherein said $2^{nd}$ cavity is partly formed by the preliminary product wherein steps i) to iii) are performed in a single moulding unit to form a finished product, wherein the finished product is a dosing cap.

2. A method according to claim 1 comprising additional injecting steps, subsequent to step i).

3. A method according to claim 1 wherein the collar (3) of the preliminary product (2) is cooled after step i), by passive or active means.

4. A method according to claim 1 wherein the single moulding unit comprises a turntable, such that the product may be moved between the $1^{st}$ and $2^{nd}$ cavities.

5. A method according to claim 1 wherein the collar (3) is round, square or oval.

6. A method according to claim 1 wherein the connecting feature (4) is selected from the group consisting of features capable of interlocking engagement between two surfaces, bump-off frictional features which require opposite direction forces to engage and disengage, squeezing features which require a combination of perpendicular and opposite direction forces to allow partial deformation of one or multiple parts creating space to engage and disengage, and sealing feature (8).

7. A method according to claim 1 wherein the connecting feature is selected from the group consisting of a thread, a bump off feature, a sealing feature, and mixtures thereof.

8. A method according to claim 1 wherein the connecting feature is a thread (4) located on the inner surface (5) of the collar (3).

9. A method according to claim 1 wherein the product comprises a double wall comprising the collar (3) and an inner wall (7).

10. A method according to claim 9 wherein the double wall provides a pouring spout (9).

11. A method according to claim 1 wherein the void volume (6) is suitable for containing between about 10 ml to about 250 ml of a substance.

12. A method according to claim 1 wherein the void volume (6) is suitable for containing between about 25 ml to 150 ml of a substance.

13. A method according to claim 1 wherein the void volume (6) is suitable for containing between about 35 ml to about 100 ml of a substance.

14. A method according to claim 1 wherein the collar (3) is round.

15. A method according to claim 3 wherein the collar (3) of the preliminary product (2) is cooled by active means using coolant which is passed close to, but separated from the moulding unit.

16. A method according to claim 1 wherein the collar (3) of the preliminary product (2) is cooled to a point below the glass transition temperature of the material.

17. A method of manufacturing a product (1) by the steps of
   i) injecting a sufficiently heated thermoplastic material into a $1^{st}$ cavity to form a preliminary product (2) comprising a double wall having a collar (3) and an inner wall (7) wherein a sealing feature (8) is located between the collar (3) and the inner wall (7) wherein the sealing feature (8) annularly circumscribes the inner wall (7) wherein the collar (3) has an inner surface (5) wherein a connecting feature (4) is located on the inner surface (5) wherein the connecting feature is a thread (4) and wherein the sealing feature (8) extends outwardly perpendicular to the connecting feature (4) then
   ii) optionally cooling the preliminary product (2) of step i), then
   iii) blow moulding the preliminary product in a $2^{nd}$ cavity to form a void volume (6), wherein said $2^{nd}$ cavity is partly formed by the preliminary product, wherein steps i) to iii) are performed in a single moulding unit to form a finished product, wherein the finished product is a dosing cap.

18. A method of manufacturing a product (1) by the steps of
   i) injecting a sufficiently heated thermoplastic $1^{st}$ material into a $1^{st}$ cavity to form a $1^{st}$ preliminary product (2) comprising a collar (3) having a connecting feature (4) located on the inner surface (5) thereof, then
   ii) cooling the $1^{st}$ preliminary product (2) of step i), wherein said $1^{st}$ preliminary product forms part of a new cavity, then
   iii) injecting a sufficiently heated thermoplastic $2^{nd}$ material into the new cavity of step ii) wherein the $1^{st}$ material of step i) and the $2^{nd}$ material of step ii) are in direct contact with one another and are at a temperature sufficient to achieve bonding, to form a $2^{nd}$ preliminary product, and wherein said $1^{st}$ material is not the same material as said $2^{nd}$ material, then
   iv) blow moulding the $2^{nd}$ preliminary product of step iii) in a $2^{nd}$ cavity to form a void volume (6),
   wherein steps i) to iv) are performed in a single moulding unit to form a finished product.

* * * * *